No. 668,603. Patented Feb. 19, 1901.
M. V. RUSH.
BICYCLE TIRE.
(Application filed Aug. 31, 1899.)
(No Model.)
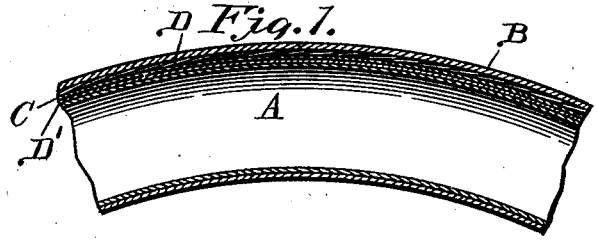
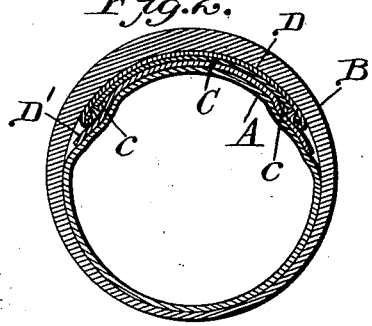
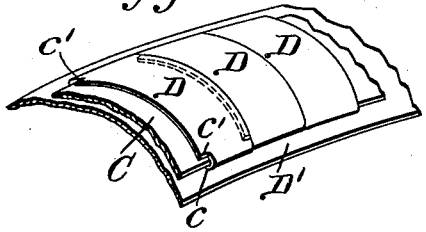
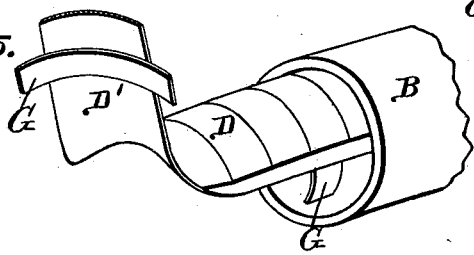
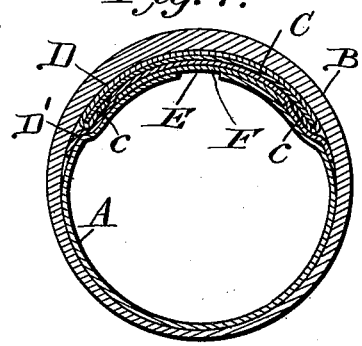
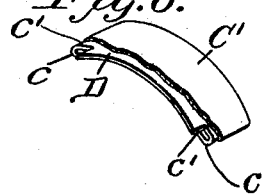
WITNESSES:
Edwin G. McKee.
Geo. M. Anderson.
INVENTOR
M. V. Rush
BY
E. W. Anderson
his ATTORNEY.
THE NORRIS PETERS CO., PHOTO-LITHO., WASHINGTON, D. C.

United States Patent Office.

MARTIN V. RUSH, OF ANDERSON, INDIANA.

BICYCLE-TIRE.

SPECIFICATION forming part of Letters Patent No. 668,603, dated February 19, 1901.

Application filed August 31, 1899. Serial No. 729,075. (No model.)

*To all whom it may concern:*

Be it known that I, MARTIN V. RUSH, a citizen of the United States, and a resident of Anderson, in the county of Madison and State of Indiana, have invented certain new and useful Improvements in Bicycle-Tires; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a longitudinal section of a double-tube tire having my invention applied thereto. Fig. 2 is a transverse section of the same. Fig. 3 is a detail view of the armor. Fig. 4 is a detail view showing a modified construction. Fig. 5 is a detail view showing the invention as applied to a single-tube tire. Fig. 6 shows one of the armor-sections provided with a fabric covering.

This invention has relation to pneumatic tires for bicycles and like vehicles, and is designed to provide means of improved character whereby the inner tubes of such tires may be effectually protected against punctures or whereby such tubes may be dispensed with and the outer tube similarly protected.

With these objetcs in view the invention consists in the novel construction and combination of parts, all as hereinafter described, and pointed out in the appended claims.

Referring to the accompanying drawings, the letter A designates the inner tube, and B the outer tube, of a pneumatic bicycle-tire. Interposed between said tubes is a protection device or armor of the following character and construction:

C designates a strip of leather, cloth, rawhide, or other suitable thin pliable material, to which are secured a continuous series of slightly-overlapping armor sections or segments D, formed preferably of thin spring-steel. These sections or segments are secured to the strip C by having their lateral edges bent under and inward to form the clasp-lips c, which embrace and bite the lateral edges of said strip, as shown. To form the joints between said sections, in order that the armor formed thereby may possess the necessary flexibility, the sections are slightly overlapped, the corners of the overlapped sections being cut away, as shown at c'. In this manner a close-fitting, neat, and impenetrable joint is formed capable of permitting the armor to assume the necessary curved form when applied to a tire and which will also allow each individual section or segment its necessary movement. If desired, each section may be inclosed in a suitable fabric covering C'.

The strip C is glued to a second and somewhat wider strip D' of rawhide, leather, or other suitable flexible material, which may be secured to the inner tube. This may be done by splitting the inner tube longitudinally, as shown at E in Fig. 4, its split edges being separated somewhat and cemented to a rubber strip F in an air-tight manner, said rubber strip being in turn cemented to the strip D', or the strip D' may be cemented or otherwise secured in any suitable manner to the inner tube.

The armor may be applied to the inner circumference of the outer tube and the inner tube dispensed with. A convenient way of securing the armor to the outer tube is to cement transversely-extending rubber strips G to the inner face of the strip D', which rubber strips are then cemented to the tire.

The overlapping armor-sections form an effectual guard against puncture by any of the ordinary causes of such accidents, and being of resilient material they tend to increase rather than destroy the elasticity and resiliency of the tire.

Having thus described my invention, what I claim as new, and desire to secure by Letters Patent, is—

1. In a pneumatic tire, the combination with the outer and the inner tubes, of a series of short arched armor-sections of steel or the like disposed between such tubes, each said section having its corner portions cut away at one end thereof to receive and overlap the opposing end portion of the adjacent section, a carrying-strip of flexible material for and of the same width as such sections, each of which has lateral underturned clamping-flanges engaging the sides of such flexible strip, and a second strip of flexible material secured to said armor-carrying strip and located and secured between the same and the inner tube, substantially as specified.

2. An armor for pneumatic tires, comprising a series of short arched sections of steel or the like, each having its corner portions cut away at one end thereof to receive and overlap the opposing end portion of the adjacent section, a carrying-strip of flexible material for and of the same width as such sections, each of which has lateral underturned clamping-flanges engaging the sides of such strip, and means for securing such strip and its sections in place, substantially as specified.

In testimony whereof I affix my signature in presence of two witnesses.

MARTIN V. RUSH.

Witnesses:
SAMUEL P. MOORE,
D. C. CHIPMAN.